Dec. 27, 1955 W. L. SCHLEGEL, JR 2,728,569
AXLE ASSEMBLY
Filed Jan. 23, 1952
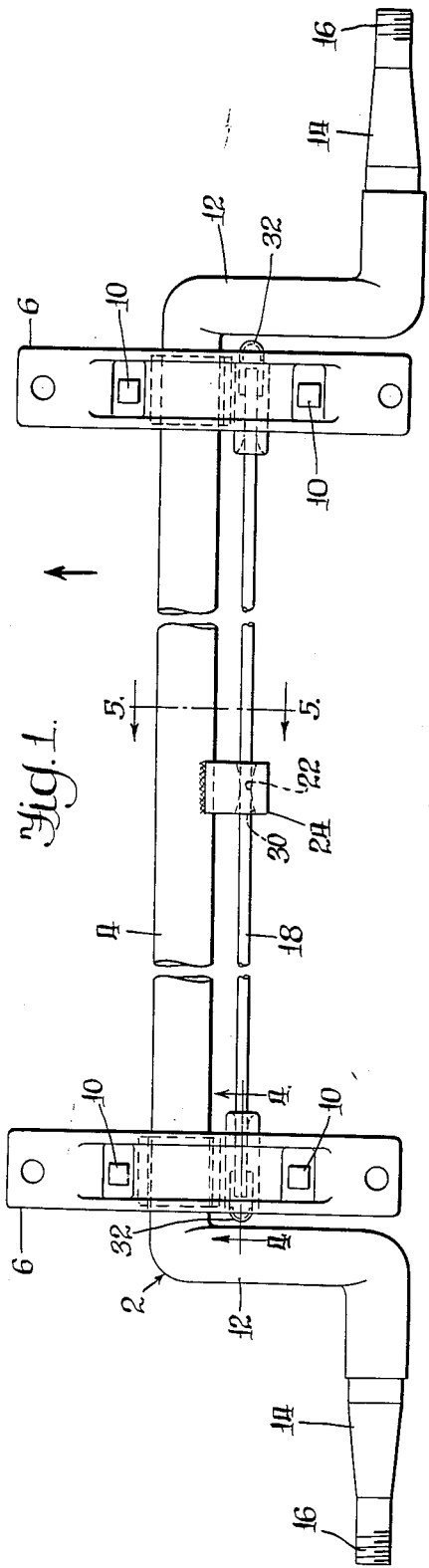
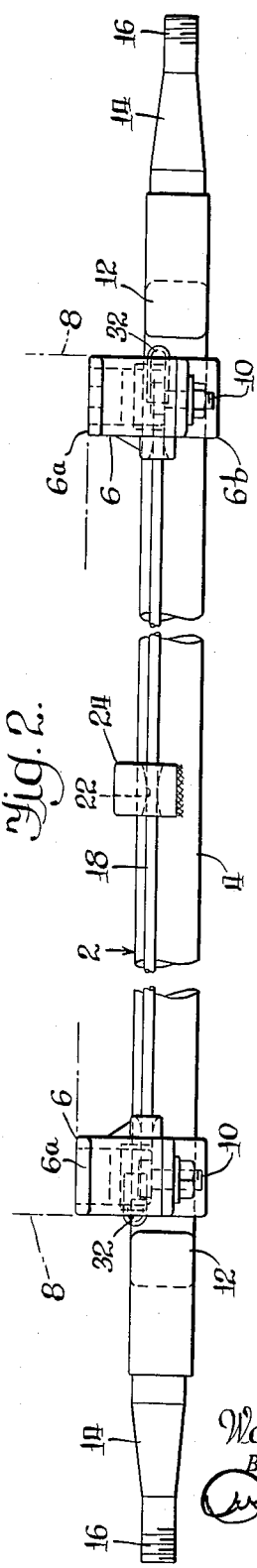
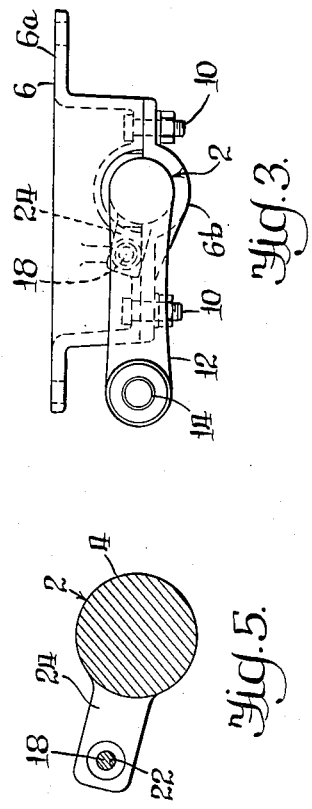
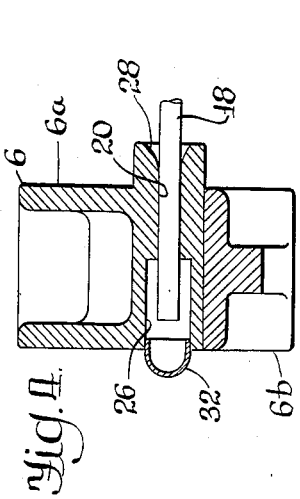
INVENTOR.
Walter L. Schlegel, Jr.
BY
Atty United States Patent Office 2,728,569
Patented Dec. 27, 1955

2,728,569

AXLE ASSEMBLY

Walter L. Schlegel, Jr., Chicago, Ill., assignor to American Steel Foundries, Chicago, Ill., a corporation of New Jersey Application January 23, 1952, Serial No. 267,863

4 Claims. (Cl. 267—19)

This invention relates to a wheel and axle assembly for a trailer or the like and has for an object the provision of a structure of this type which is relatively simple and inexpensive in construction, easy to install and service, and capable of cushioning a trailer during normal use of the latter.

Briefly, the present invention comprises an axle journaled within suitable bearing brackets secured to a trailer body and provided at each of its ends with a crank arm having a wheel spindle disposed in offset parallel relation to the axis of rotation of the axle. The wheel spindles are disposed in a trailing position during use on a trailer and move in an arcuate path responsive to vertical movement of the trailer body. To yieldably resist rotation of the axle when a load force acts to move the trailer body downwardly, a resilient metal rod is connected to the axle and has its ends slidably engaged within bores in the bearing brackets.

This invention further contemplates the provision of a wheel and axle assembly in which the spring rod has its ends snugly engaged within their respective bearing bracket bores to frictionally dampen rotational movement of the axle during vertical movement of the trailer. If desired, the axis of the bores may be angularly disposed to the axle to pre-stress the spring rod and to increase its resistance to movement relative to the bearing brackets.

This invention embodies other novel features, details of construction and arrangement of parts which are hereinafter set forth in the specification and claims and illustrated in the accompanying drawing wherein:

Figure 1 is a top plan view illustrating a wheel and axle assembly embodying features of the present invention.

Figure 2 is a side elevational view of same.

Figure 3 is an end view of same.

Figure 4 is a sectional view taken along the line 4—4 of Figure 1.

Figure 5 is a transverse sectional view taken along the line 5—5 of Figure 1.

Referring now to the drawing for a better understanding of the present invention and more particularly to Figures 1 to 5 therein, the axle assembly is shown as comprising an axle 2 having a journal portion 4 supported for rotational movement in spaced bearing brackets 6—6 integral with or adapted to be secured to the underside of a trailer body 8 by means of bolts, screws or other fastening means. Each bracket 6 is of the split type comprising two sections 6a and 6b enclosing a split bearing and secured together by bolts or screws 10.

A crank arm 12 is provided on each end of the journal portion 4 of the axle and projects laterally therefrom to support a wheel spindle 14 adapted to receive a wheel (not shown), the end of the spindle being threaded at 16 to receive a wheel retaining nut (not shown). The axle 2 is preferably of a one-piece forged steel construction but may be formed of several sections welded together.

In either form of construction, it will be noted that the spindles are coaxially aligned for arcuate movement about the axis of the journal portion 4. In mounting the axle assembly upon a trailer body, the wheel spindles 14—14 are disposed in a trailing position rearwardly from the journal portion 4, as indicated in Figure 1 in which the arrow indicates the direction of forward movement of the trailer.

To yieldably resist upward arcuate movement of the spindles 14—14 about the axis of the journal portion 4, the ends of a straight resilient rod 18, preferably formed of spring steel, are snugly slidably engaged within coaxial bores 20—20 formed in the bearings brackets 6—6, and the medial portion of the rod is engaged within an aperture 22 in a torque arm 24 welded or otherwise secured to the journal portion.

As illustrated in Figure 4, each end of the rod 18 extends into a chamber 26 formed in its respective bracket 6, the wall defining the chamber being spaced from the end of the rod to prevent gouging by the end of the rod during movement of the latter outboardly through the bore. It will also be noted that the inboard end of each bore 20 is formed with a bell-shaped opening 28 to receive the rod 18. The ends of the aperture 22 are also formed with bell-shaped openings 30. If desired, each chamber 26 may be closed at its outboard end by means of a suitable cap 32.

When a wheel and axle assembly of the type shown and described is applied to a trailer, the spring rod 18 acts to yieldably resist upward arcuate movement of the wheel spindles 14—14 when a load force is applied downwardly on the trailer. When the axle 2 is rotated in a clockwise direction, as illustrated in Figure 5, the medial portion of the rod 18 is bowed upwardly by the torque arm 24 and the ends of the rod are drawn toward each other along a common axis through the bores 20—20, the walls of the bores frictionally engaging the enclosed portions of the rod and acting as a snubbing means to yieldably resist shock loads. During a decrease in load on the trailer, the rod 18 acts to rotate the axle in a counter-clockwise direction to return the spindles 14—14 to a lower position relative to the journal portion 4.

While this invention has been shown in but one form it is obvious to those skilled in this art that it is not so limited but is susceptible of various changes and modifications without departing from the spirit and scope of the claimed invention.

I claim:

1. In an axle assembly, a pair of spaced bearing brackets, an axle having a journal portion rotatably mounted in said brackets, crank arms projecting laterally from the ends of the journal portion, a wheel spindle provided on the outer end of each crank arm, and means including a resilient rod interconnecting the axle and said bearing brackets to yieldably resist rotation of the axle relative to the brackets, the medial portion of said rod being connected to a torque arm secured to the medial portion of said journal portion, the end portions of said rod being slidably and rotatably engaged in coaxial bores provided in said brackets, whereby rotation of said axle acts to draw the ends of the rod toward each other and to stress said rod in bending only.

2. In an axle assembly, a pair of spaced bearing brackets, an axle having a journal portion rotatably mounted in said brackets, crank arms projecting laterally from the ends of the journal portion, a wheel spindle provided on the outer end of each crank arm, and means including a resilient rod interconnecting the axle and said bearing brackets to yieldably resist rotation of the axle relative to the brackets, the medial portion of said rod being connected to a torque arm secured to the medial portion of said journal portion, the end portions of said rod being slidably and rotatably engaged in coaxial bores provided in said brackets, whereby rotation of said axle acts to draw the ends of the rod toward each other and to stress said rod in bending only, said brackets having bell-shaped openings at the inboard ends of said bores.

3. In an axle assembly, a pair of spaced bearing brackets, an axle having a journal portion rotatably mounted in said brackets, crank arms projecting laterally from the ends of the journal portion, a wheel spindle provided on the outer end of each crank arm, and means including a resilient rod interconnecting the axle and said bearing brackets to yieldably resist rotation of the axle relative to the brackets, the medial portion of said rod being connected to a torque arm secured to the medial portion of said journal portion, the end portions of said rod being slidably and rotatably engaged in coaxial bores provided in said brackets, whereby rotation of said axle acts to draw the ends of the rod toward each other and to stress said rod in bending only, said brackets having bell-shaped openings at the inboard ends of said bores, said brackets having enlarged chambers adjacent the outboard ends of said bores to enclose the ends of said rod.

4. In an axle assembly, a pair of spaced bearing brackets, an axle having a journal portion rotatably mounted in said brackets, crank arms projecting laterally from the ends of the journal portion, a wheel spindle provided on the outer end of each crank arm, and means including a resilient rod interconnecting the axle and said bearing brackets to yieldably resist rotation of the axle relative to the brackets, the medial portion of said rod being connected to a torque arm secured to the medial portion of said journal portion, the end portions of said rod being slidably and rotatably engaged in coaxial bores provided in said brackets, whereby rotation of said axle acts to draw the ends of the rod toward each other, said brackets having bell-shaped openings at the inboard ends of said bores, said brackets having enlarged chambers adjacent the outboard ends of said bores to enclose the ends of said rod, and a cap inserted into the end of each chamber.

References Cited in the file of this patent

UNITED STATES PATENTS

| | | |
|---|---|---|
| 428,628 | Percy | May 27, 1890 |
| 2,169,373 | Porsche | Aug. 15, 1939 |
| 2,426,513 | Linn | Aug. 26, 1947 |
| 2,438,432 | Edwards | Mar. 23, 1948 |
| 2,511,046 | Chipps | June 13, 1950 |
| 2,569,787 | Taylor | Oct. 2, 1951 |

FOREIGN PATENTS

| | | |
|---|---|---|
| 42,214 | Denmark | May 1, 1930 |
| 12,234 | Great Britain | 1913 |
| 519,524 | Great Britain | Mar. 29, 1940 |
| 752,056 | France | July 3, 1933 |